US011320053B2

United States Patent
Kamppila et al.

(10) Patent No.: US 11,320,053 B2
(45) Date of Patent: May 3, 2022

(54) VALVE WITH A SEALING SURFACE THAT MINIMIZES WEAR

(71) Applicant: NELES FINLAND OY, Vantaa (FI)

(72) Inventors: Arttu Kamppila, Vantaa (FI); Pietari Skott, Vantaa (FI); Antti Kuitunen, Vantaa (FI); Arto Juntura, Vantaa (FI)

(73) Assignee: NELES FINLAND OY, Vantaa (FI)

( * ) Notice: Subject to any disclaimer, the term of this patent is extended or adjusted under 35 U.S.C. 154(b) by 0 days.

(21) Appl. No.: 17/052,112

(22) PCT Filed: May 2, 2018

(86) PCT No.: PCT/FI2018/050318
§ 371 (c)(1),
(2) Date: Oct. 30, 2020

(87) PCT Pub. No.: WO2019/211505
PCT Pub. Date: Nov. 7, 2019

(65) Prior Publication Data
US 2021/0054939 A1 Feb. 25, 2021

(51) Int. Cl.
*F16K 1/226* (2006.01)
*F16K 1/20* (2006.01)
*F16K 1/22* (2006.01)

(52) U.S. Cl.
CPC ............ *F16K 1/226* (2013.01); *F16K 1/2014* (2013.01); *F16K 1/2042* (2013.01); *F16K 1/222* (2013.01); *F16K 1/2261* (2013.01); *F16K 1/2263* (2013.01)

(58) Field of Classification Search
CPC ...... F16K 1/226; F16K 1/2261; F16K 1/2263; F16K 1/2014; F16K 1/2042; F16K 1/222

USPC ................................................ 251/305–308
See application file for complete search history.

(56) References Cited

U.S. PATENT DOCUMENTS

| | | | | |
|---|---|---|---|---|
| 3,963,213 A | * | 6/1976 | Brattberg | F16K 1/226 251/306 |
| 4,265,426 A | * | 5/1981 | Thurston | F16K 1/2263 251/306 |
| 4,284,264 A | | 8/1981 | Hubertson | |
| 4,411,405 A | * | 10/1983 | Barbe | F16K 1/226 251/306 |

(Continued)

FOREIGN PATENT DOCUMENTS

CN 102141156 A 8/2011
GB 2 047 387 A 11/1980

OTHER PUBLICATIONS

Oct. 25, 2018 International Search Report issued in International Patent Application No. PCT/FI2018/050318.

(Continued)

*Primary Examiner* — John Bastianelli
(74) *Attorney, Agent, or Firm* — Oliff PLC (57) ABSTRACT

A valve including: a flow channel and a closure member. A first sealing surface is provided along walls of the flow channel and a second sealing surface is provided along outer edges of a sealing section of the closure member. A rotation axis is offset from the sealing section by a first predetermined distance and from a centerline of the closure member by a second predetermined distance. To ensure smooth operation of the closure member at least one of the first and second sealing surfaces has a non-conical shape that is at least in one area asymmetric with respect to the center axis of the closure member.

5 Claims, 6 Drawing Sheets

(56) References Cited

U.S. PATENT DOCUMENTS

| | | | | |
|---|---|---|---|---|
| 4,436,281 | A | 3/1984 | Chiron | |
| 4,480,815 | A * | 11/1984 | Kreij | F16K 1/226 |
| | | | | 251/298 |
| 4,601,459 | A * | 7/1986 | Verdelet | F16K 1/226 |
| | | | | 251/306 |
| 4,770,393 | A * | 9/1988 | Hubertson | F16K 1/2263 |
| | | | | 251/306 |
| 5,975,494 | A * | 11/1999 | Gasaway | F16K 1/2263 |
| | | | | 251/305 |
| 6,702,257 | B1 * | 3/2004 | Mollmann | F16K 1/222 |
| | | | | 251/306 |
| 9,470,318 | B2 * | 10/2016 | Fan | F16K 1/226 |
| 2016/0290514 | A1 * | 10/2016 | Misumi | B23P 15/001 |
| 2017/0001271 | A1 | 1/2017 | Fan | |

OTHER PUBLICATIONS

Jun. 12, 2020 International Preliminary Report on Patentability issued in International Patent Application No. PCT/FI2018/050318.

Oct. 25, 2018 Written Opinion issued in International Patent Application No. PCT/FI2018/050318.

* cited by examiner

VALVE WITH A SEALING SURFACE THAT MINIMIZES WEAR

BACKGROUND OF THE INVENTION

Field of the Invention

This invention relates to a butterfly valve and in particularly to the shape of the sealing surfaces utilized in a butterfly valve.

Description of Prior Art

Previously there is known a valve with a flow channel extending between a first opening and a second opening. A closure member (a disc) is arranged in the flow channel to be rotatable around a rotation axis of a drive shaft for moving the closure member between an open position and a closed position.

A first sealing surface on a side of body of the valve and a second sealing surface on a side of the closure member contact each other in the closed position of the closure member to prevent flow through the flow channel. The first sealing surface may be, for example, a seat ring clamped to the body of the valve. The second sealing surface may be, for example, machined on an edge of the closure member mating the seat ring. Alternatively, the first sealing surface may be machined on the body of the valve, and the second sealing surface may be a seat ring located on the closure member, or, still alternatively, the both sealing surfaces may be surfaces of separate seat rings. The mating sealing surfaces may be solid or laminated, metal-to-metal or metal-to-plastic designs, for example.

Figure 1:
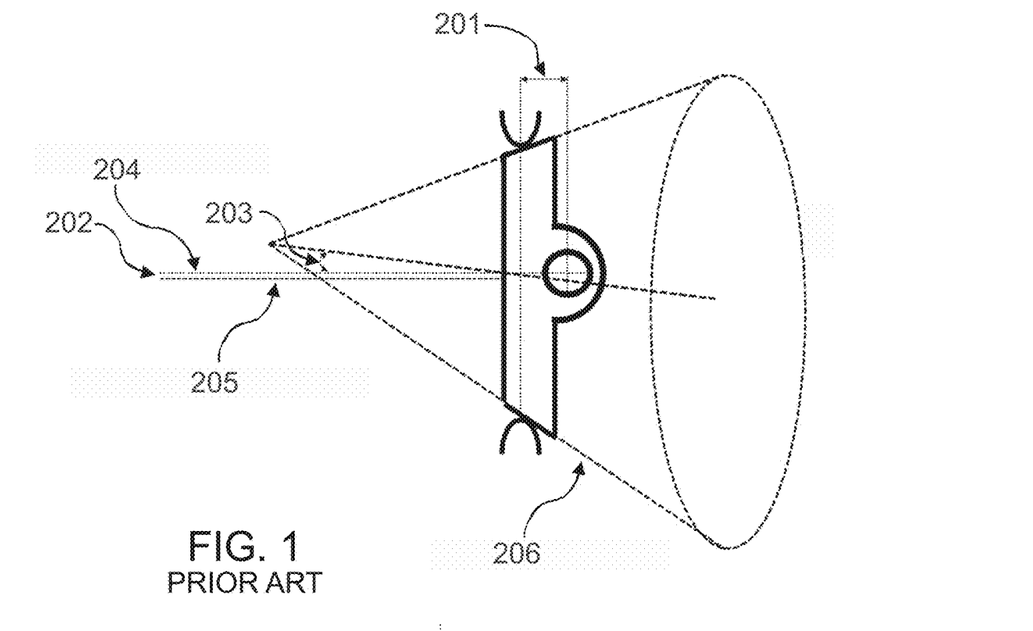
FIGS. 1 to 3 illustrate triple offset valve according the prior art.

Typically, such a previously known butterfly valve has a triple offset/eccentric design shown in FIG. 1; to obtain the first offset 201 the rotation axis of the closure member is placed behind a centerline of a sealing point of the sealing surfaces ($1^{st}$ eccentricity), to obtain the second offset 202 the rotation axis 204 of the closure member (shaft center line) is offset from a centerline of the closure member or a valve bore ($2^{nd}$ eccentricity), and to obtain the third offset 203 an axis of a cone defining shape of the sealing surface is offset from the centerline 205 of the closure member ($3^{rd}$ eccentricity). The shape of the sealing surface formed by the surface of the cone 206 can be best seen from FIG. 2.

Figure 2:
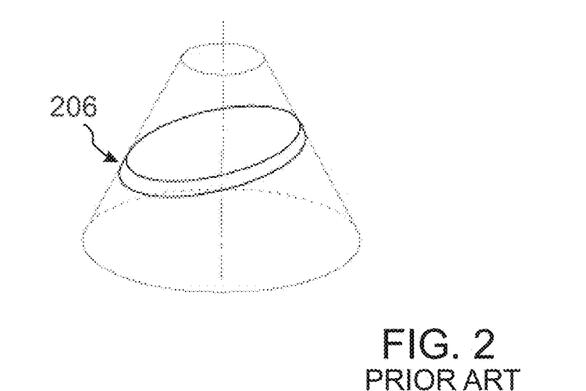
Figure 3:
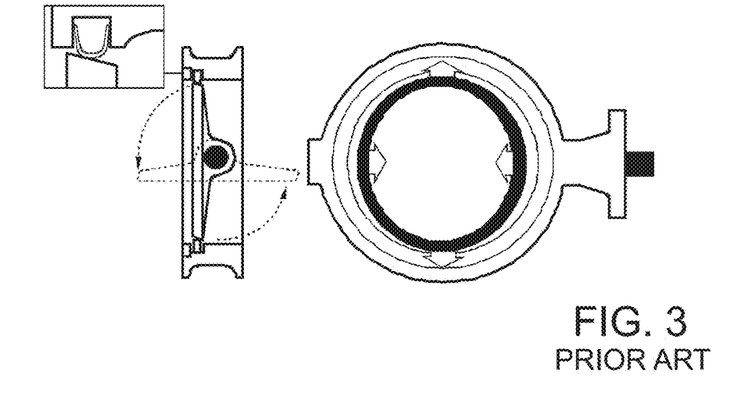

One example of such valve is Neles® Neldisc high performance triple eccentric butterfly valve manufactured by Metso Corporation. FIG. 3 illustrates Neldisc triple eccentric seating principle. The disc of the valve is machined to close tolerances to create an elliptical shape similar to an oblique slice taken from a solid metal cone, as shown in FIGS. 1 and 2. When the valve is closed, the elliptical disc at a major axis of the closing member (perpendicular to the rotation axis of the shaft) displaces a floating seat ring outward, causing it to contact the disc at a minor axis of the closing member (parallel to the rotation axis of the shaft). When the valve is opened, the contact is released and the seat ring returns to its original circular shape. The triple offset design basically results in the sealing surface contact only at the final point of closure and over-travel-free stroking of the closure member throughout its operating cycle.

A challenge with such a previously known valve is to ensure that the valve is as tight as possible while the closure member is in the closed position and that sealing integrity of the valve is preserved over the life cycle.

SUMMARY OF THE INVENTION

An object of the present invention is to solve the above-mentioned problem and to obtain an improved valve. This object is achieved with a valve according to independent claim 1 and a closure member according to independent claim 12.

Use of a triple eccentric non-conical shape at the sealing surface makes it possible to obtain a shape that minimizes wear caused by turning the closure member simultaneously as the performance of the valve is improved.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 4:
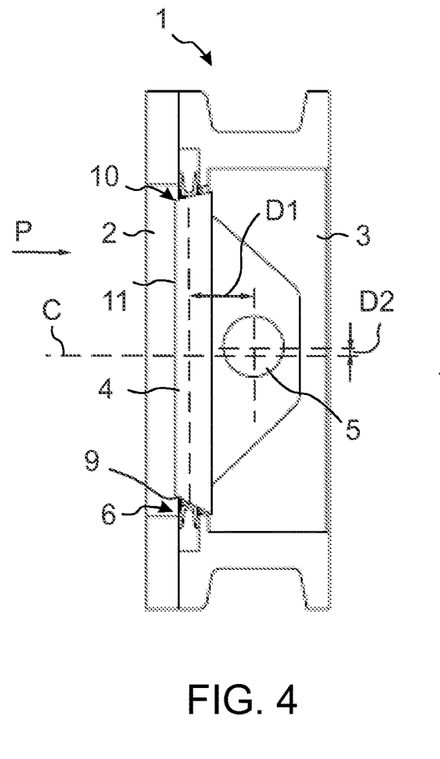
FIGS. 4 to 8 illustrate a first embodiment of a valve.
Figure 5:
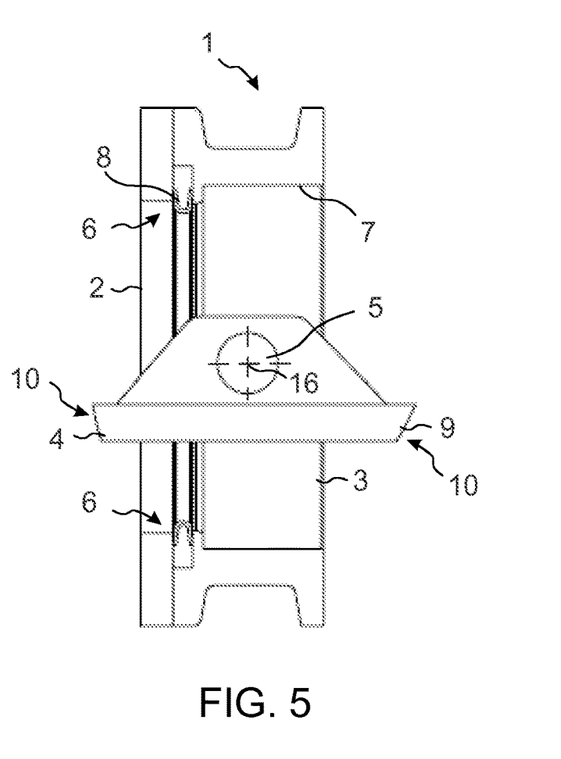

FIGS. 4 to 8 illustrate a first embodiment of a valve 1. The valve comprises a flow channel extending between a first opening 2 and a second opening 3. A closure member 4 is arranged in the flow channel to be rotatable around a rotation axis 16 by means of a force transmitted by a drive shaft 5 between a closed position, as illustrated in FIG. 4, and an open position, as illustrated in FIG. 5.

In the embodiment of FIGS. 4 to 8, a first sealing surface 6 is provided along walls 7 of the flow channel. In the illustrated example, the first sealing surface 6 is provided by a seal 8, such as a sealing ring, extending along the wall 7 delimiting the flow channel. One alternative is to utilize a metallic seal, such as a U-shaped sealing ring made of stainless steel, for instance. Such a sealing ring may be circular or alternatively slightly elliptical. A second sealing surface 9 is provided along outer edges of a sealing section 10 of the closure member 4. Consequently, the sealing section 10 extends in the illustrated embodiment around the entire circumference of the closure member 4 to provide the second sealing surface 9. In the closed position of the closure member 4 the first sealing surface 6 contacts the second sealing surface 9 such that flow of fluid between the first opening 2 and the second opening 3, and vice versa, is prevented.

In the illustrated example, the rotation axis 16 is offset from the sealing section 10 by a first predetermined distance D1. In FIG. 4 the first predetermined distance D1 is illustrated as the distance between the rotation axis 16 and a line extending through a middle part of the sealing section 10, in praxis between the contact points of the first and second sealing surfaces 6 and 9. Additionally, in the example of FIG. 4, a center line C of the closure member 4 is offset from the rotation axis 16 by a second predetermined distance D2.

Figure 6:
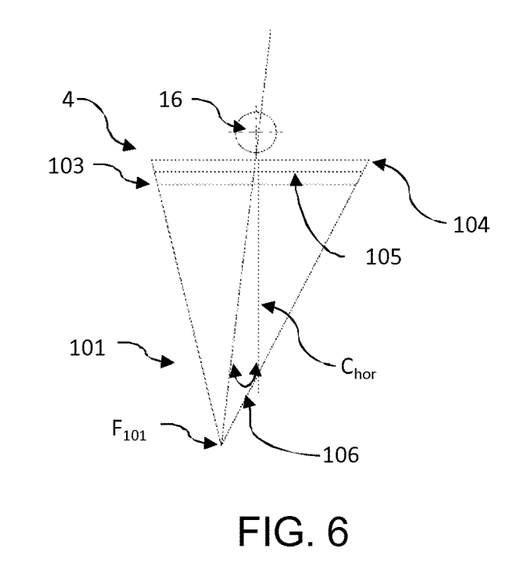
Figure 7:
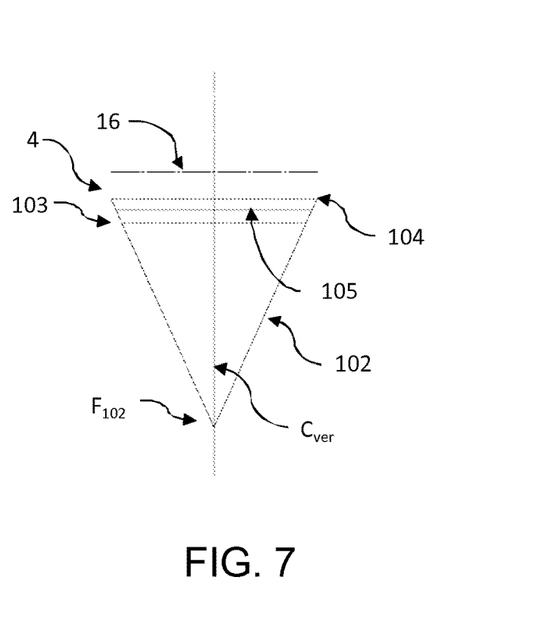
Figures 8, 9:
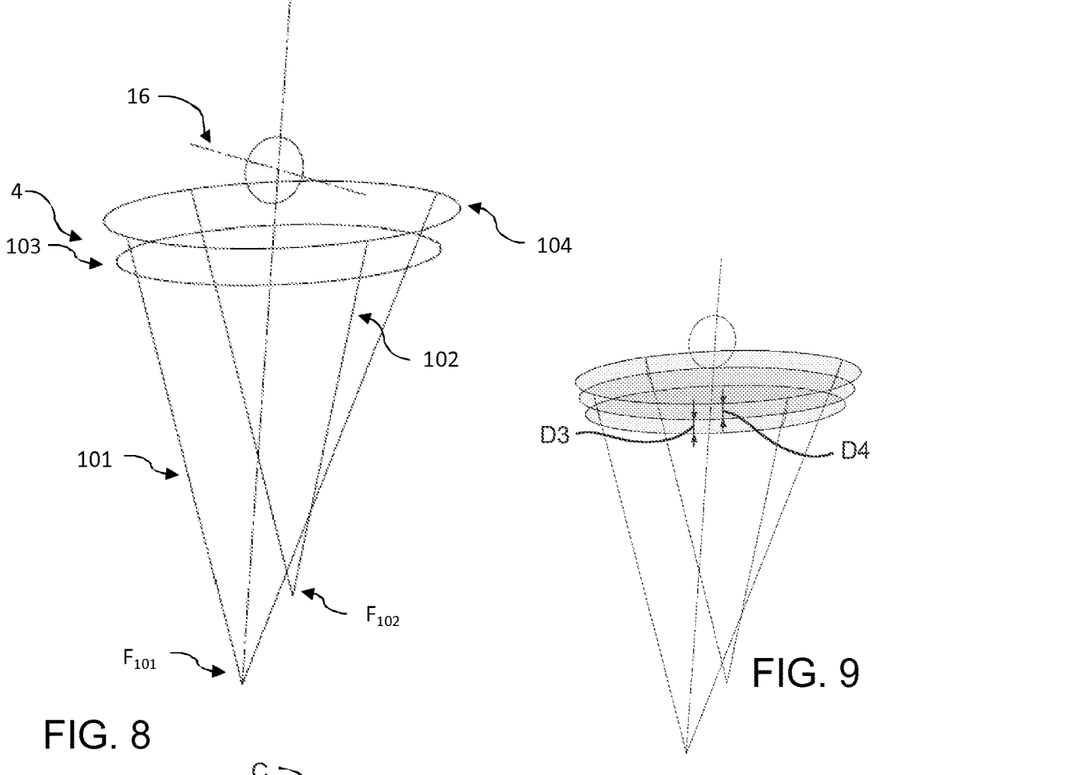
FIGS. 9 to 14 illustrate a second embodiment of a valve.

FIGS. 6 to 8 illustrate in closer detail the shape of the closure member 4 of FIGS. 4 and 5. FIG. 6 illustrates the closure member when viewed in a direction along the rotation axis 16, FIG. 7 illustrates the closure member 4 when viewed in a direction which is perpendicular to the rotation axis 16 and FIG. 8 is a 3D illustration of the same.

As can be seen from FIG. 6, a vertical cross section of a cone 101 is offset 106 from the the centerline $C_{hor}$ of the closure member 4, which basically corresponds to the 3$^{rd}$ eccentricity known from the prior art valves. In praxis, it means that the closure member 4 has in a plane defined by the vertical cross section of the cone 101 a shape that is asymmetric with respect to the center axis $C_{hor}$ of the closure member. However, as can be seen from FIGS. 6 to 8, the shape of the second sealing surface 9 is non-conical, i.e. the full surface of the cone 101 is not used to define shape of the second sealing surface 9, and there is no single point (i.e. vertex) to which a lateral surface of a cone tapers. Instead, the second sealing surface 9 can be defined as a super-polyconically developable surface. The shape of the second sealing surface 9 can be defined by at least two vertical cross section of at least two cones 101, 102, or simply triangles, whose apexes, or "focal points", $F_{101}$, $F_{102}$ are offset in respect to each other, as shown in FIGS. 6 to 8. The vertical cross section of the first cone 101 is perpendicular to the rotation axis 16 of the shaft 5. The vertical cross section of the second cone 102 is parallel to the rotation axis 16 of the shaft 5. The closure member 4 is illustrated by a line 103 representing a front surface of the closure member 4 or a front edge of the sealing surface 9 of the closure member 4, the design of which is not show in detail in FIGS. 6 to 8. A line 104 represents a rear surface of the closure member 4 or a rear edge of the second sealing surface 9 of the closure member 4, the design of which is not show in detail in FIGS. 6 to 8. As can be seen from FIG. 6, the vertical cross section of the cone 101 is offset from a centerline $C_{hor}$ of the closure member 4, corresponding to the third eccentricity of the known triple eccentric butterfly valves. However, similarly taken cross sections in any other plane do not share the same focal point $F_{101}$. Instead, as can be seen for example from FIG. 7, the vertical cross section of the cone 102 has a focal point $F_{102}$, which is offset from the focal point $F_{101}$. The shape of the entire circumference of the second sealing surface 9 can be defined by a series of any number of vertical cross sections of cones, or simply triangles, whose apexes are offset in respect to each other, provided that the integrity of the sealing surface is maintained throughout the sealing section of the closure member. For example, in the embodiment of FIGS. 6 to 8, it means that the apexes, or the focal points, of the sequential cross sections of cones, or simply triangles, gradually shifts from point $F_{101}$ to point $F_{102}$ and the series of focal point of the sequential cross sections of cones forms a line or a curve. Accordingly, the shape of the second sealing surface 9 is gradually changed from the shape defined by the vertical cross section of the first cone 101 to the shape defined by the vertical cross section of the second cone 102. For the sake of clarity, it is pointed out that only two vertical cross sections of cones 101 and 102 are shown in Figures, but it should be understood that the shape of the sealing surface throughout its entire circumference could be illustrated in more detail by any number of cross sections of additional cones. Opening angles of such a series of vertical cross sections of cones, or simply triangles, can be controlled e.g. by a common base, which can be, for example, a circle or an ellipse. For example, in the embodiment of FIGS. 6 to 8, the common base of the series of vertical cross section of cones can be an ellipse illustrated by the line 103 or 104. Alternatively, it can be a line 105 representing a centerline of a sealing point of the second sealing surface 9, which can be a circle or only slightly elliptical shape.

FIGS. 9 to 14 illustrate a second embodiment of a valve. The embodiment of FIGS. 9 to 14 is very similar to the one described in the FIGS. 4 to 8. Therefore, in the following, the embodiment of FIGS. 9 to 14 will be mainly explained by pointing out the differences between these embodiments.

It can be envisaged that the shape of the second sealing surface 9 can still mainly be defined by at least two vertical cross section of at least two cones (101, 102) whose apexes are offset in respect to each other, although that is not necessary. In the example illustrated in FIGS. 9 to 14 the shape of the second sealing surface 9 is defined by at least three parallel sections 103, 104 and 105, which are arranged on top of each others at predetermined distances D3 and D4 in the thickness direction 200 of the closure member 4, parallel to the rotation shaft 16. First section 103 represents a front surface of the closure member 4 or a front edge of the second sealing surface 9 of the closure member 4, the design of which is not show in detail in FIGS. 9 to 14. Second section 104 represents a rear surface of the closure member 4 or a rear edge of the second sealing surface 9 of the closure member 4, the design of which is not show in detail in FIGS. 9 to 14. Third section 105 represents a layer between the first and the second sections 103, 104. In the example of FIGS. 9 to 14, the sections 103, 104 and 105 each have major axes $L_{MA103}$, $L_{MA104}$, $L_{MA105}$ and minor axes $L_{MI103}$, $L_{MI104}$, $L_{MI105}$. All sections 103, 104, 105 are symmetrical and, thus, major dimension $D_{MA103}$ of the first section 103 is $2 \times L_{MA103}$, minor dimension $D_{MI103}$ of the first section 103 is $2 \times L_{MI103}$, etc. In the illustrated example, the first section 103 is definable by at least three points of four points A103 to D103, or by a centerpoint C103 and the minor axis $L_{MI103}$ and the major axis $L_{MA103}$, for example. The second and third sections 104, 105 are similarly definable.

The sections 103, 104, 105 have variable section ratios in the thickness direction 200, i.e. $L_{MI103}/L_{MA103} \neq L_{MI105}/L_{MA105} \neq L_{MI104}/L_{MA104}$. In the exemplary embodiment, all sections 103, 104, 105 are also of elliptical shape, i.e. $L_{MI103} \neq L_{MA103}$, $L_{MI105} \neq L_{MA105}$, $L_{MI104} \neq L_{MA104}$. However, it could also be that at least one of the sections 103, 104, 105 is circular, for example $L_{MI105} = L_{MA105}$.

Figure 10:
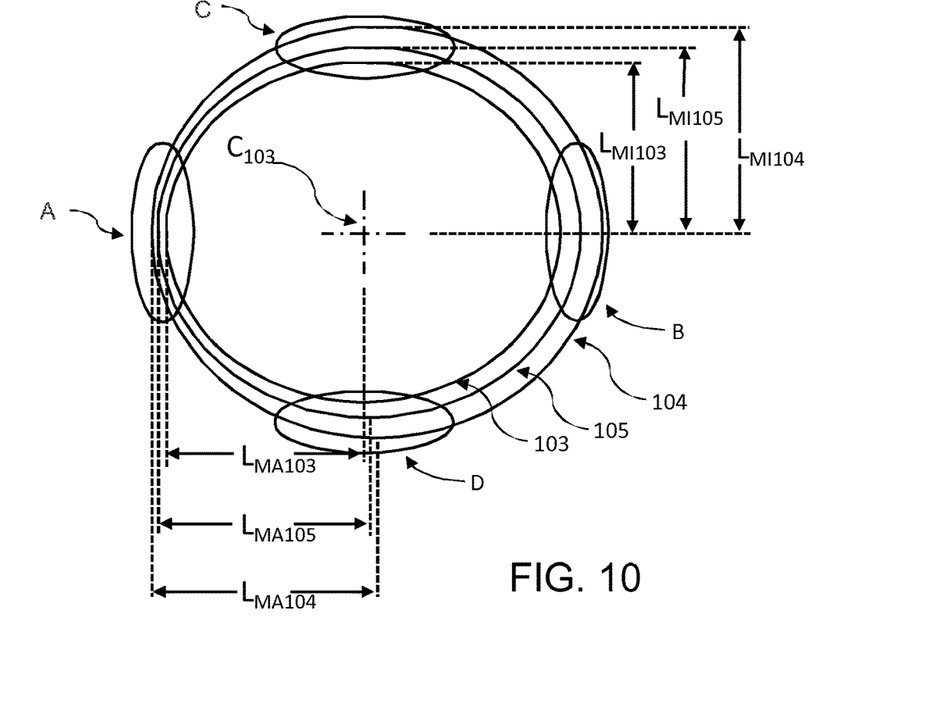
Figures 11, 12, 13, 14:
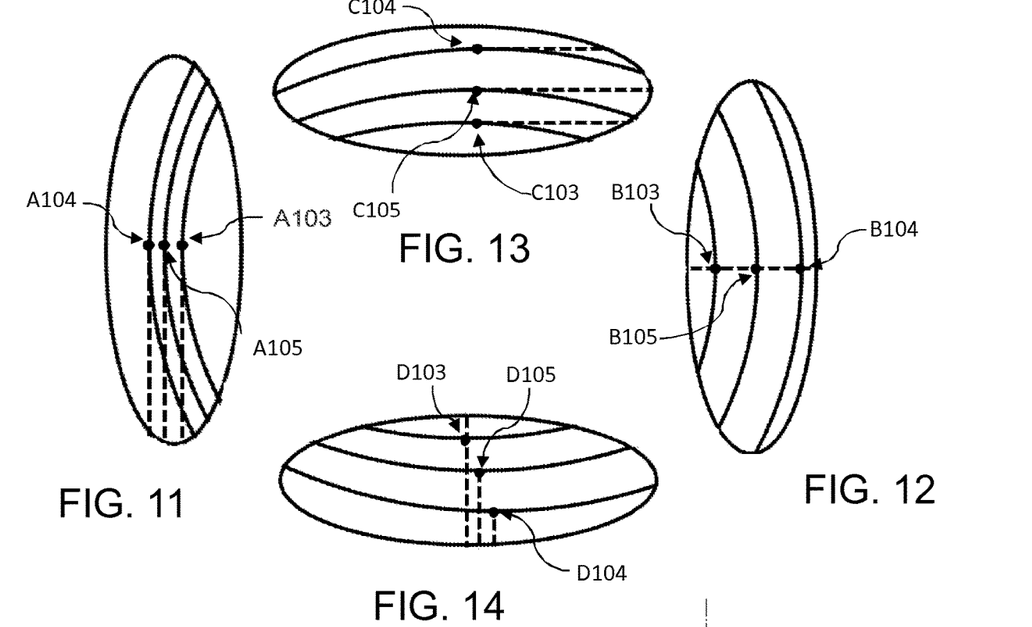
Figure 15:
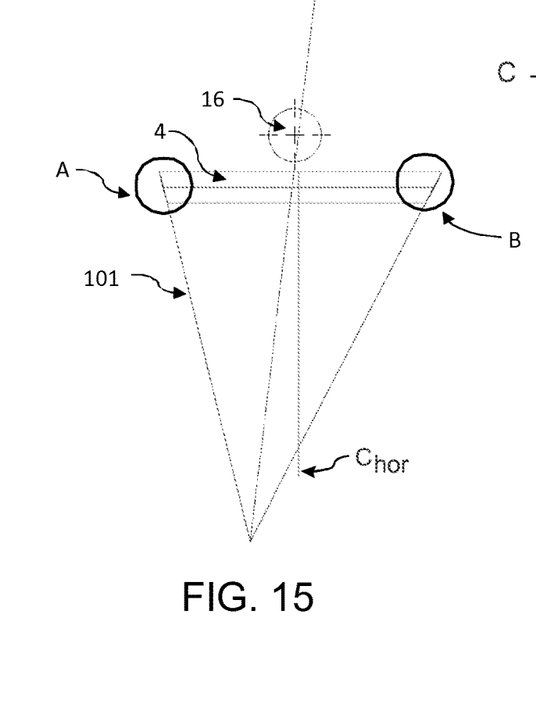
FIGS. 15 to 20 illustrate a third embodiment of a valve
Figure 16:
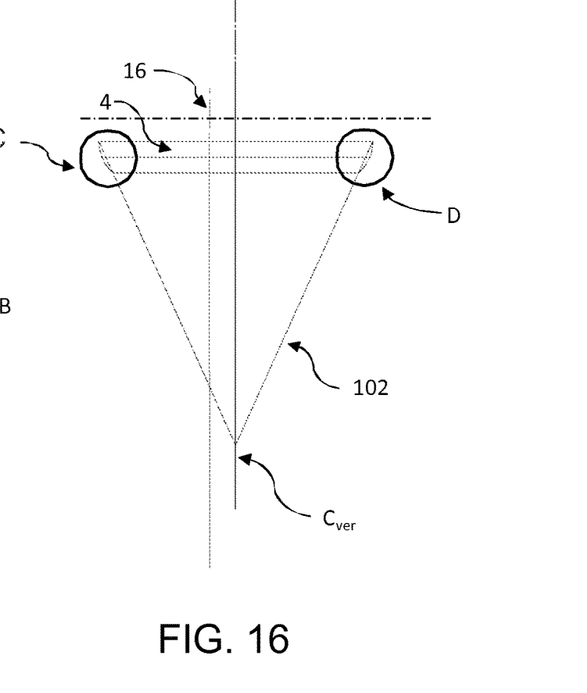
Figure 17:
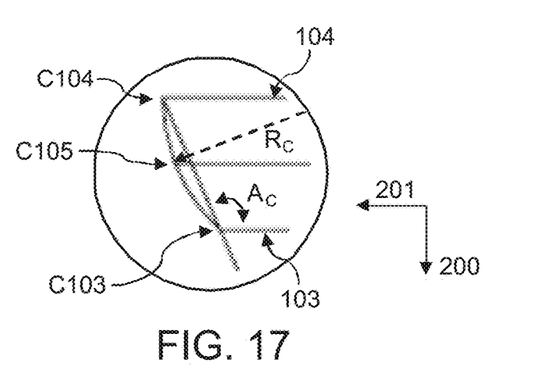
Figure 18:
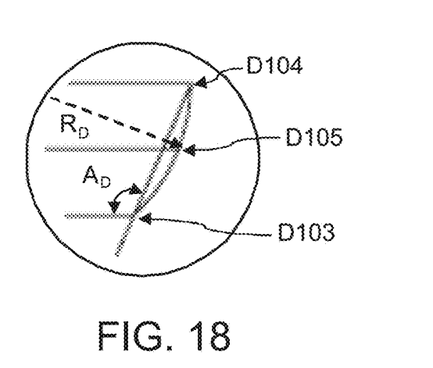
Figure 19:
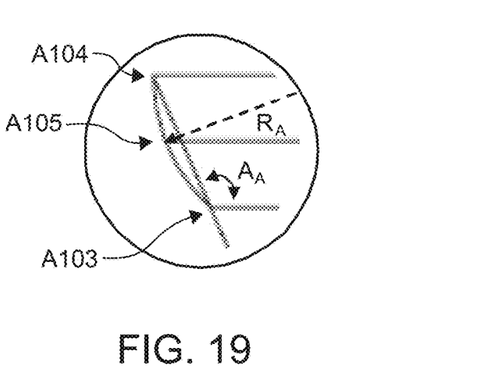
Figure 20:
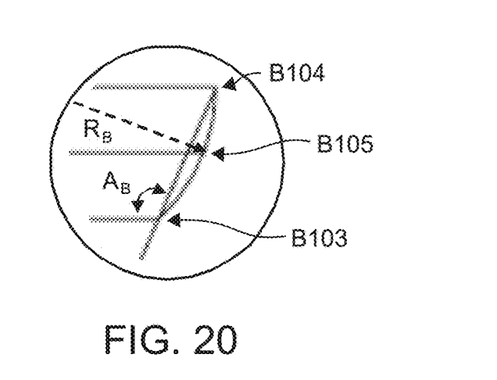

Center point $C_{103}$ of the first section 103 is shown in the FIG. 10. For the purpose of clarity, center points $C_{104}$ and $C_{105}$ of the second and third sections 104, 105 (below section 103) are not shown in the FIG. 10, but as can be gathered from a horizontal center line and vertical center lines shown in the FIG. 10, the center points $C_{103}$, $C_{104}$ and $0_{105}$ are offset with respect to each other in the direction of the major axis of the closing member 4. Due to this offset, the closure member 4 has at least in areas A and B shape that is asymmetric with respect to the center axis of the closure member. This is (exaggeratedly) shown in FIGS. 10 to 13.

FIGS. 15 to 20 illustrate a third embodiment of a valve. The embodiment of FIGS. 15 to 20 is very similar to the ones described in the connection with FIGS. 4 to 14. Therefore, in the following, the embodiment of FIGS. 15 to 20 will be mainly explained by pointing out the differences between these embodiments.

It can be envisaged that the shape of the second sealing surface 9 can still mainly be defined by at least two vertical cross section of at least two cones (101, 102), whose apexes are offset in respect to each other, although that is not necessary. Contrary to the first and the second embodiment of the invention, the second sealing surface 9 has at least in a plane defined by the vertical cross section of the second cone 102, i.e. in the plane defined by a first the center axis ($C_{ver}$) of the closure member 4, i.e. at the minor axis of the closure member 4, a rounded shape (profile) in the thickness direction 200 of the closure member 4, as can be seen from a partial enlarged view of area C in FIG. 17. Further, as can be seen from the partial enlarged view of the area C, two points C103 and C104 that are at a first predetermined distance from each other in a thickness direction 200 of the closure member 4 and at a second predetermined distance in a radial direction 201 of the closure member 4, define an angle ($A_C$) of the shape of the second sealing surface 9. In the example shown in FIGS. 16 and 17, roundness of the the second surface shapeprofile 9 is definable by at least one additional point C105 that together with points C103 and C104 form an arc of a circle having a radius $R_C$. In the example shown in FIG. 16, the closure member 4 is symmetrical with respect to the center axis $C_{ver}$ of the closure member 4, and, thus, the shape of the second sealing surface in the opposite side of the closure member 4 in area D is identically angled and rounded ($R_C=R_D$), yet it is freely definable by similar points D103 to D105 shown in the FIG. 18 and, thus, could have also different rounded shape.

In the example of FIGS. 15 to 20, the shape of the second sealing surface 9 in the plane defined by the vertical cross section of the first cone 101, i.e. in areas A and B at a major axis of the the closing member 4, are definable by points A103, A104, and B103, B104. The shapes may be straight lines between the points A103/A104 and B103/B104, or slightly rounded in the thickness direction 200 of the closure member 4 as shown in the FIGS. 19 and 20. Roundness of the surface shape profile in the area A is definable by at least one additional point A105 that together with points A103 and A104 form an arc of a circle having a radius $R_A$. Roundness of the surface shape in the area B is definable by at least one additional point B103 that together with points B101 and B102 form an arc of a circle having a radius $R_B$. Sealing surface angle $A_A$ in the area A is smaller than the sealing surface angle $A_B$ in the area B. In praxis, it means that the closure member 4 is asymmetric with respect to the center axis $C_{hor}$ of the closure member. Radiuses $R_A$ and $R_B$ in the area A and B may be of the same or different sizes. Roundness of the second sealing surface 9 in areas A to D does not have to be circular, but it can be any other suitable round shape definable by at least three points provided that the sealing integrity of the sealing surface is maintained throughout the second sealing surface 9 of the closure member 4. The sealing surface in any other plane between these sections around the entire circumference of the closure member 4 can be defined by any computational method known as such, for example, by lofting, provided that the integrity of the sealing surface is maintained throughout the sealing section of the closure member.

An advantage of the non-conical, double-curved sealing surface controlled by super-poly-conically developable shape is that at the major axis of the closing member 4, the closing member 4 displaces or stretches a seal 8 outward optimally, i.e. the seat ring is more equally stretched by the closing member 4. It also enables improved clearance to the closing member 4 to turn from a closed position to an open position, and vice versa, without contact being made between the first and the second sealing surfaces 6, 9. Due to the optimised sealing surface, better tightness, less wear and/or less friction between the first and second sealing surfaces can be obtained.

Figure 21:
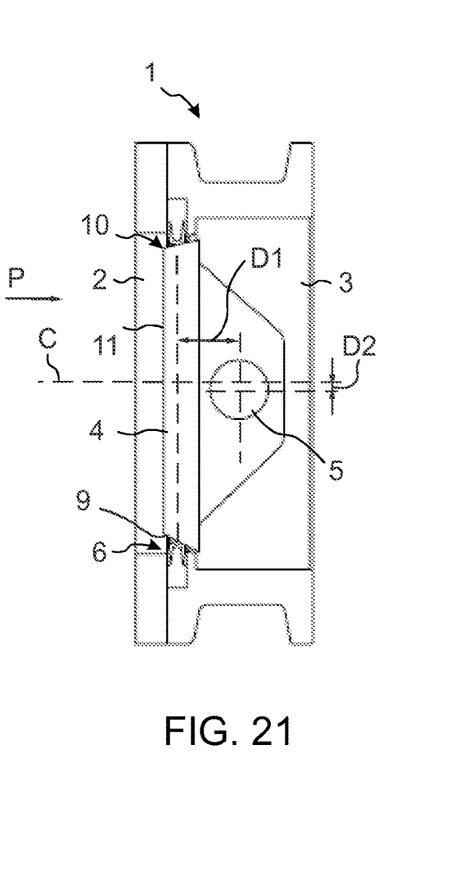
FIG. 21 illustrates a fourth embodiment of a valve and FIG. 22 illustrates a fifth embodiment of a valve.

FIG. 21 illustrates a fourth embodiment of a valve. The embodiment of FIG. 21 is very similar to the one described in the connection with FIGS. 4 to 20. Therefore, in the following, the embodiment of FIG. 21 will be mainly explained by pointing out the differences between these embodiments.

As it was described above, in the example of FIG. 4, the center line C of the closure member 4 is offset from the rotation axis 16 by a second predetermined distance D2. Consequently, a fluid pressure acting on the surface 11 of the closure member in the direction illustrated by arrow P results in a torque which attempts to open the closure member from the closed position illustrated in FIG. 4. However, such a torque is not necessary or desirable in all situations. Now, due to the advantages of the embodiments of the invention described above, it may be possible that the offset determined by distance D2 is substantially decreased from what is necessary for the conical state of the art designs. Depending on the design parameters of the design, and especially due to the rounded shape in areas C and D at the minor axis of the valve 1, it may be possible to decrease distance to zero, or even make it "negative", i.e. locating the rotation axis on the opposite side of the centerline C, as is illustrated in FIG. 21. Thus, the design of the closing member 4 optimized according to the embodiments described above may also enable optimisation of pressure behavior of the valve per customers' needs, for example, either pressure assisted closing of closing member 4, pressure assisted opening of the closing member 4 or a pressure balanced closing member 4, which may be beneficial for example due to reduced requirement of momentum resulting to selection of smaller and less expensive actuator, for example.

Figure 22:
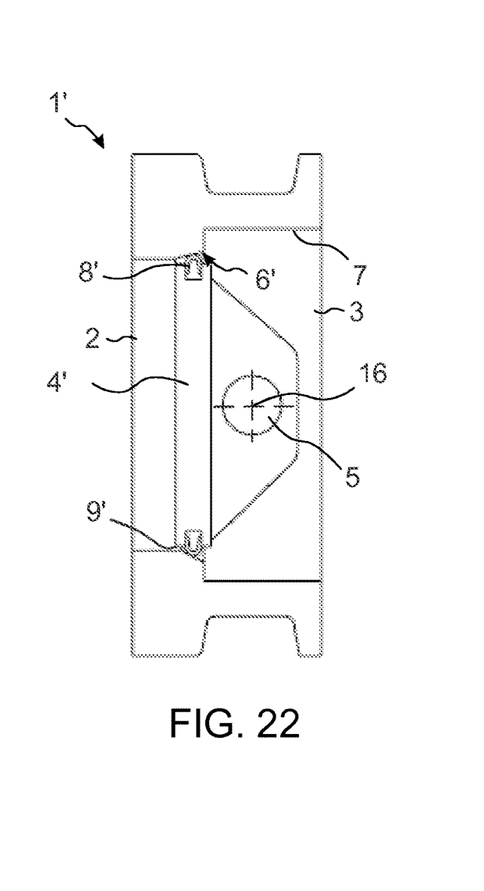

FIG. 22 illustrates a fifth embodiment of a valve. The embodiment of FIG. 22 is very similar to the one described in connection with FIGS. 4 to 21. Therefore, in the following, the embodiment of FIG. 22 will be mainly explained by pointing out the differences between these embodiments.

In FIG. 22 the valve 1' with the closure member 4' is illustrated in the closed position, similarly as is the case in FIG. 4. The first sealing surface 6' of the valve 1' which extends along the walls 7 of the flow channel has the previously explained shape. Additionally, the seal 8' is differently located, as in this embodiment the seal 8' is located in the second sealing surface 9' extending along outer edges of the sealing section of the closure member 4'.

It is to be understood that the above description and the accompanying figures are only intended to illustrate the present invention. It will be obvious to a person skilled in the art that the invention can be varied and modified without departing from the scope of the invention.

The invention claimed is:

1. A valve comprising:
 a flow channel extending between a first opening and a second opening, and
 a closure member arranged in the flow channel, said closure member being rotatable around a rotation axis for moving the closure member between an open position and a closed position, wherein:
    a first sealing surface is provided along walls of the flow channel and a second sealing surface is provided along outer edges of a sealing section of the closure member, such that the first and second sealing surfaces contact each other in the closed position of the closure member, and
    the rotation axis is offset from the sealing section by a first predetermined distance,
    the rotation axis is offset from a centerline of the closure member by a second predetermined distance,
    at least one of the first and second sealing surfaces has a non-conical shape that is at least in one area asymmetric with respect to the center axis of the closure member, and said shape is definable by vertical cross sections of a series of cones whose apexes are offset in respect to each other, and
    at least one of the first and second sealing surfaces has a shape that is definable by at least a first, a second and a third sections, which are arranged on top of each other parallel to the rotation axis at predetermined distances in the thickness direction of the closure member, and wherein the at least three parallel sections have center points that are offset with respect to each other in a direction of a major axis of the closure member and wherein at least one of the first and second sealing surfaces has a rounded shape at least in one location.

2. A valve comprising:

a flow channel extending between a first opening and a second opening, and a closure member arranged in the flow channel, said closure member being rotatable around a rotation axis for moving the closure member between an open position and a closed position, wherein:
- a first sealing surface is provided along walls of the flow channel and a second sealing surface is provided along outer edges of a sealing section of the closure member, such that the first and second sealing surfaces contact each other in the closed position of the closure member, and
- the rotation axis is offset from the sealing section by a first predetermined distance,
- the rotation axis is offset from a centerline of the closure member by a second predetermined distance,
- at least one of the first and second sealing surfaces has a non-conical shape that is at least in one area asymmetric with respect to the center axis of the closure member, and said shape is definable by vertical cross sections of a series of cones whose apexes are offset in respect to each other, and
- at least one of the first and second sealing surfaces has a shape that is definable by at least a first, a second and a third sections, which are arranged on top of each other parallel to the rotation axis at predetermined distances in the thickness direction of the closure member, and which have minor axes that are parallel to the rotation axis and major axes that are perpendicular to the rotation axis, wherein at least one of the at least three parallel sections has a section ratio that does not equal to 1, and the section ratios of the at least three parallel section in the thickness direction of the closure member are variable.

3. The valve according to claim 2, wherein the first section is defined by at least three points, the second section is defined by at least three points and the third section is defined by at least three points, and
   wherein the shape of the sealing surface at the minor axis of the valve is defined by at least two points on the first and second section and the shape of the sealing surface at the major axis of the valve is defined by at least two points on the first and second section.

4. The valve according to claim 2, wherein the at least three parallel sections have center points that are offset with respect to each other in a direction of a major axis of the closure member.

5. The valve according to claim 2, wherein the second predetermined distance is zero.

* * * * *